United States Patent
Long et al.

(10) Patent No.: US 11,753,976 B2
(45) Date of Patent: Sep. 12, 2023

(54) ASYMMETRICAL CHANNEL STRUCTURE OF PARTICULATE TRAP FILTER BODY

(71) Applicant: DALIAN UNIVERSITY OF TECHNOLOGY, Liaoning (CN)

(72) Inventors: Wuqiang Long, Liaoning (CN); Ge Xiao, Liaoning (CN); Hua Tian, Liaoning (CN); Jingchen Cui, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 264 days.

(21) Appl. No.: 17/281,214

(22) PCT Filed: Oct. 8, 2019

(86) PCT No.: PCT/CN2019/109982
§ 371 (c)(1),
(2) Date: Mar. 29, 2021

(87) PCT Pub. No.: WO2020/064023
PCT Pub. Date: Apr. 2, 2020

(65) Prior Publication Data
US 2021/0404356 A1    Dec. 30, 2021

(30) Foreign Application Priority Data
Sep. 29, 2018    (CN) .......................... 201811150998.8

(51) Int. Cl.
*F01N 3/022* (2006.01)
*B01D 46/24* (2006.01)
*F01N 3/02* (2006.01)

(52) U.S. Cl.
CPC .......... *F01N 3/022* (2013.01); *B01D 46/247* (2013.01); *B01D 46/249* (2021.08);
(Continued)

(58) Field of Classification Search
CPC .... F01N 3/022; F01N 3/0222; F01N 2330/34; B01D 46/247; B01D 46/2486;
(Continued)

(56) References Cited

U.S. PATENT DOCUMENTS

2003/0230080 A1* 12/2003 Nakatani ............... F01N 3/0222
                                                                60/311
2005/0076627 A1*  4/2005 Itou ..................... B01D 46/2478
                                                                55/523
(Continued)

FOREIGN PATENT DOCUMENTS

CN        1289799 C        12/2006
CN     104053486 A         9/2014
(Continued)

Primary Examiner — Audrey B. Walter
(74) Attorney, Agent, or Firm — NKL Law; Allen Xue

(57) ABSTRACT

A particulate trap filter body has asymmetrical channels. The cross-sectional shape of the asymmetrical channel structure includes a combination of hexagonal, square and triangular shapes. The hexagonal channel and the triangular channel act as inlet channel, and the square channel acts as outlet channel. Compared with the traditional symmetrical filter body structure, the inlet channel volume and filter body wall area can be effectively increased by more than 30%, which means that with capturing the same amount of particles, the particle cake layer formed on the wall surface is thinner. The limiting carbon load of the new channel structure is increased by more than 30%, having a very positive effect on reducing the regeneration frequency and prolonging the service life of the trap.

9 Claims, 8 Drawing Sheets

(52) U.S. Cl.
CPC ..... *B01D 46/2486* (2021.08); *B01D 46/2488* (2021.08); *B01D 46/2492* (2021.08); *F01N 3/0222* (2013.01); B01D 2279/30 (2013.01); F01N 2330/34 (2013.01)

(58) Field of Classification Search
CPC .............. B01D 46/2488; B01D 46/249; B01D 46/2492; B01D 2279/30
See application file for complete search history.

(56) References Cited

U.S. PATENT DOCUMENTS

| | | | |
|---|---|---|---|
| 2008/0124517 A1* | 5/2008 | Beall | B01D 46/2492 428/118 |
| 2009/0205301 A1* | 8/2009 | Komori | F01N 3/0222 55/522 |
| 2010/0009024 A1 | 1/2010 | Beall et al. | |
| 2010/0269697 A1 | 10/2010 | Vincent et al. | |
| 2017/0284263 A1* | 10/2017 | Powell | F01N 3/021 |

FOREIGN PATENT DOCUMENTS

| | | |
|---|---|---|
| CN | 104185496 A | 12/2014 |
| CN | 204457951 U | 7/2015 |
| CN | 104870402 A | 8/2015 |
| CN | 105324224 A | 2/2016 |
| CN | 106061578 A | 10/2016 |
| CN | 106870071 A | 6/2017 |
| CN | 106884698 A | 6/2017 |
| CN | 109209575 A | 1/2019 |
| EP | 2705891 A1 | 3/2014 |
| WO | 2008066795 A2 | 6/2008 |

\* cited by examiner

ASYMMETRICAL CHANNEL STRUCTURE OF PARTICULATE TRAP FILTER BODY

FIELD OF THE INVENTION

The present disclosure relates to the technical field of exhaust treatment of internal combustion engines, and more particularly, to an asymmetrical channel structure of particulate trap filter body.

BACKGROUND

Currently, particulate trap is the most effective and widely used post-processing device of particulate matter emission. With the particulate matter captured on the channel wall surface, the exhaust backpressure will become higher and higher, affecting the diesel performance. Therefore, it is necessary to regenerate the particulate trap regularly. However, too high regeneration frequency will not only increase the cost of post-processing, but also shorten the service life of the particulate trap. Reducing the pressure drop rise rate of the particulate trap has always been the focus of research at home and abroad. The traditional symmetrical wall-flow filter channel structure has the same shape and size of inlet and outlet channels and the pressure drop rise rate can be reduced by increasing the mesh number of the channels. However, the increase of mesh number has upper limit, and the manufacturing cost is too high.

SUMMARY OF THE INVENTION

According to the technical problems mentioned above, the present disclosure provides an asymmetrical channel structure of a particulate trap filter body to reduce the pressure drop rise rate of the current general particulate trap. The present disclosure uses inlet channels with the cross-sectional shape of hexagonal and triangular shapes and outlet channels with the cross-sectional shape of square to effectively reduce the pressure drop rise rate. The limiting carbon load of the new structure can increase by more than 30%, which has a very obvious effect on reducing the regeneration frequency of particulate trap.

The technical solutions adopted by the present disclosure are as follows:

An asymmetrical channel structure of a particulate trap filter body, the channel cross-sectional shape of the asymmetrical channel includes a combination of hexagonal, square and triangular shapes, wherein the hexagonal channel and the triangular channel act as inlet channel and the square channel acts as outlet channel, to form an asymmetrical channel structure having non-uniform inlet channel and outlet channel cross-sectional shapes or areas.

Further, the ends of the axial inlet and outlet of the inlet and outlet channels are alternately blocked to make the engine exhaust gas to be discharged after entering the inlet channel and passing through a filter wall surface, and particles in the exhaust gas are captured by the filter wall surface.

Further, in the cross-sectional direction, two opposite sides of the square channel respectively acts as sides of two hexagonal channels, and the other two opposite sides respectively acts as sides of two triangular channels, or one of the other two opposite sides acts as a side of the triangular channel and the other acts as a critical side of the filter body.

Further, a ratio of the side length b of the triangular channel wall surface to the side length a of the hexagonal channel wall surface is a preset value, and the ratio of b to a ranges from 0.5 to 5.

Further, the sides of the hexagonal channel are replaced by outward convex curves or the sides of the triangular channels are replaced by outward convex curves.

Further, the sides of the hexagonal channel are replaced by outward convex curves, and the sides of the triangular channels are replaced by outward convex curves.

Further, the sides of the hexagonal channel are replaced by outward convex broken lines or the sides of the triangular channels are replaced by outward convex broken lines.

Further, the sides of the hexagonal channel are replaced by outward convex broken lines, and the sides of the triangular channels are replaced by outward convex broken lines.

Further, the sides of the hexagonal channel are replaced by outward convex broken lines, and the sides of the triangular channels are replaced by outward convex curves.

Further, the sides of the hexagonal channel are replaced by outward convex curves, and the sides of the triangular channels are replaced by outward convex broken lines.

Compared with the prior art, the present disclosure has the following advantages:

The cross-sectional shape of the asymmetric structure includes hexagonal, triangular and square shapes, of which the hexagonal channel and the triangular channel act as inlet channel and the square channel acts as outlet channel. The structure can effectively increase the inlet channel volume and the filter wall surface area. Compared with the traditional symmetrical filter body, the inlet channel volume and the filter area of the structure are increased by more than 30%, which means that with capturing the same amount of particles, the particle cake layer formed on the wall surface is thinner. The limiting carbon loads of the new channel structure increases by more than 30%, which has a very positive effect on reducing the regeneration frequency and prolonging the service life of the trap.

Based on the above statements, the present disclosure can be widely popularized in the exhaust treatment technical field of internal combustion engine.

BRIEF DESCRIPTION OF THE DRAWINGS

In order to more clearly illustrate the embodiments of the present disclosure or the technical solutions in the prior art clearer, the drawings required in the description of the embodiments or the prior art will be briefly introduced below. Obviously, the drawings in the following descriptions are some embodiments of the present disclosure. For those of ordinary skilled in the art, other drawings can be obtained based on these drawings without inventive effort.

Figure 1:
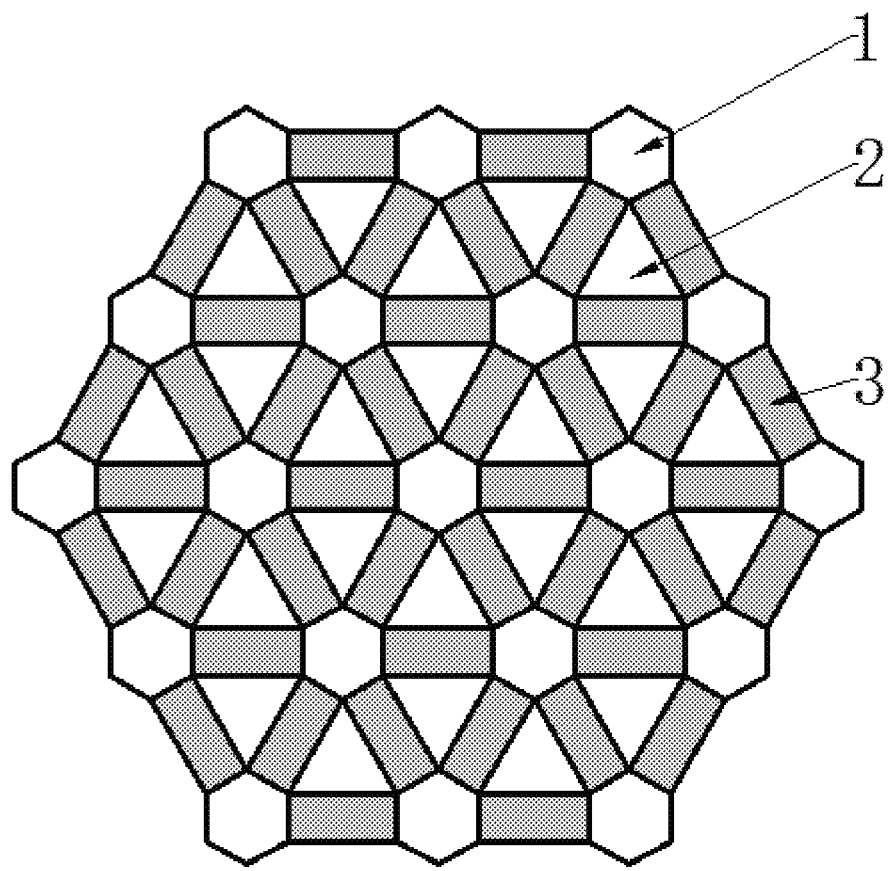
FIG. 1 is a schematic diagram of the cross-section of the asymmetrical channel structure of the present disclosure.

Wherein, 1—hexagonal channel, 2—triangular channel, 3—square channel, 4—hexagonal channel wall surface, 4a—curved channel wall surface, 4b—broken line channel wall surface, 5—triangular channel surface wall, R1/R2—radius of curved channel wall surface, A1/A2—broken angle of broken line channel wall surface.

BRIEF DESCRIPTION OF THE EMBODIMENTS

It should be noted that, in the case of no conflicts, the embodiments and the features in the embodiments of the present invention can be combined mutually. The present invention will be described in detail below with reference to the accompanying drawings and the embodiments.

To make the objectives, technical solutions, and advantages of the present invention clearer, the following clearly and completely describes the technical solutions in the embodiments of the present invention with reference to the accompanying drawings in the embodiments of the present invention. Apparently, the described embodiments are merely some rather than all of the embodiments. The following description of at least one exemplary embodiment is actually only illustrative, and in no way serves as any limitation on the present invention and its application or use. Based on the embodiments of the present invention, all the other embodiments obtained by those of ordinary skill in the art without inventive effort are within the protection scope of the present invention.

It should be noted that the terms used herein are only intended to describe specific implementations and are not intended to limit the exemplary implementations of the present invention. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present invention. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present invention, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present invention and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present invention: orientation words "inner and outer" refer to the inside and outside relative to the contour of each component.

For ease of description, spatially relative terms, such as "on", "over", "on the upper surface", and "above", can be used here to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotating 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present invention.

Figure 2:
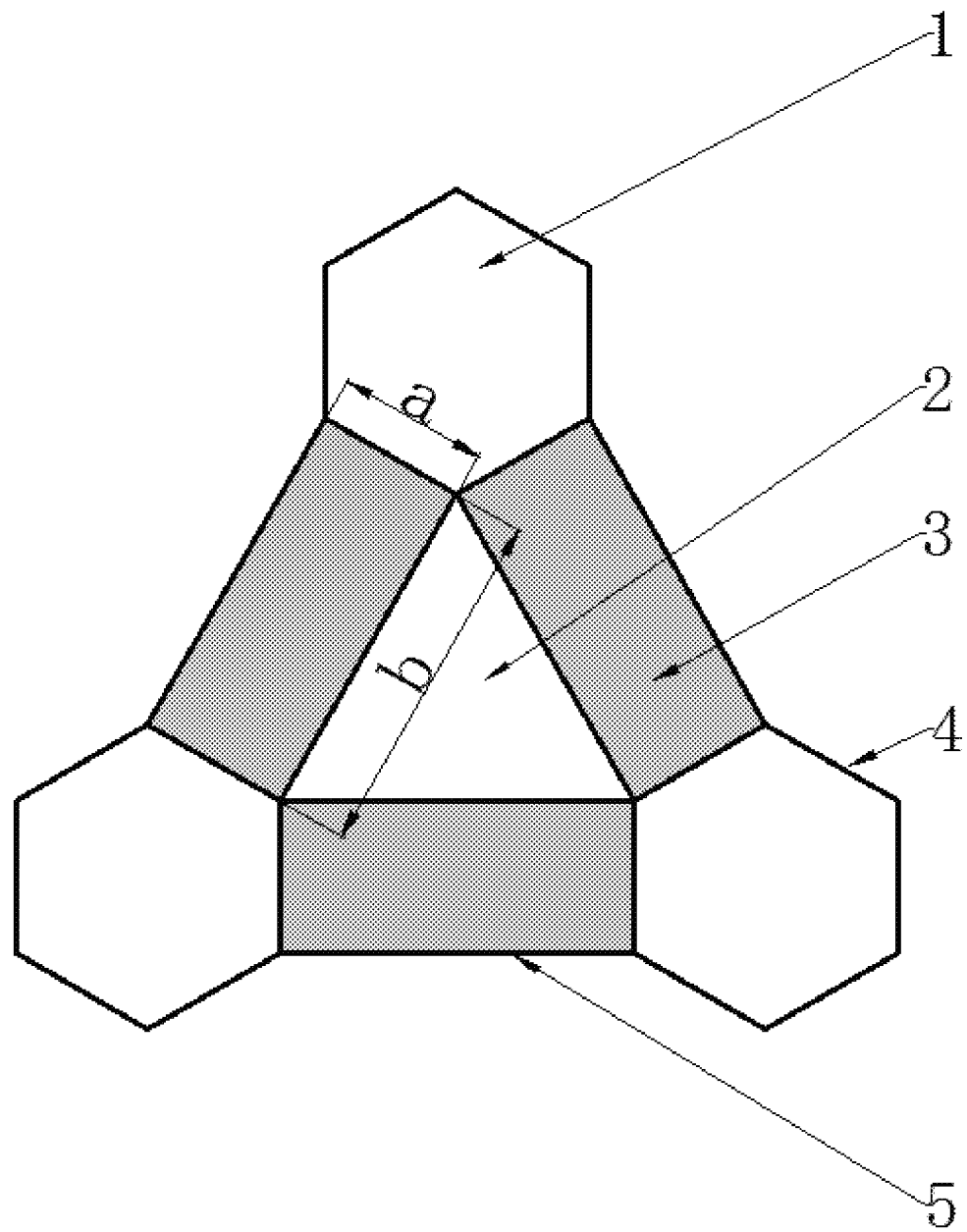
FIG. 2 is a schematic diagram of the unit cross-section of the asymmetrical channel structure of the present disclosure.

As shown in FIG. 1, the present disclosure provides an asymmetrical channel structure of a particulate trap filter body, the channel cross-sectional shape includes a combination of hexagonal, square and triangular shapes. FIG. 2 is a schematic diagram of a single unit channel cross-section, wherein the hexagonal channel 1 and the triangular channel 2 act as inlet channel, and the square channel 3 acts as outlet channel, to form an asymmetrical channel structure having non-uniform inlet channel and outlet channel cross-sectional shapes or areas.

The ratio of the side length b of the triangular channel wall surface 5 to the side length a of the hexagonal channel wall surface 4 can be adjusted, and the ratio ranges from 0.5 to 5. The axial inlet and outlet ends of the inlet and outlet channels are alternately blocked to make the engine exhaust gas to be discharged after entering the inlet channel and passing through the filter body wall surface, and particles in the exhaust gas are captured by the filter body wall surface.

Embodiment 1

Figure 3:
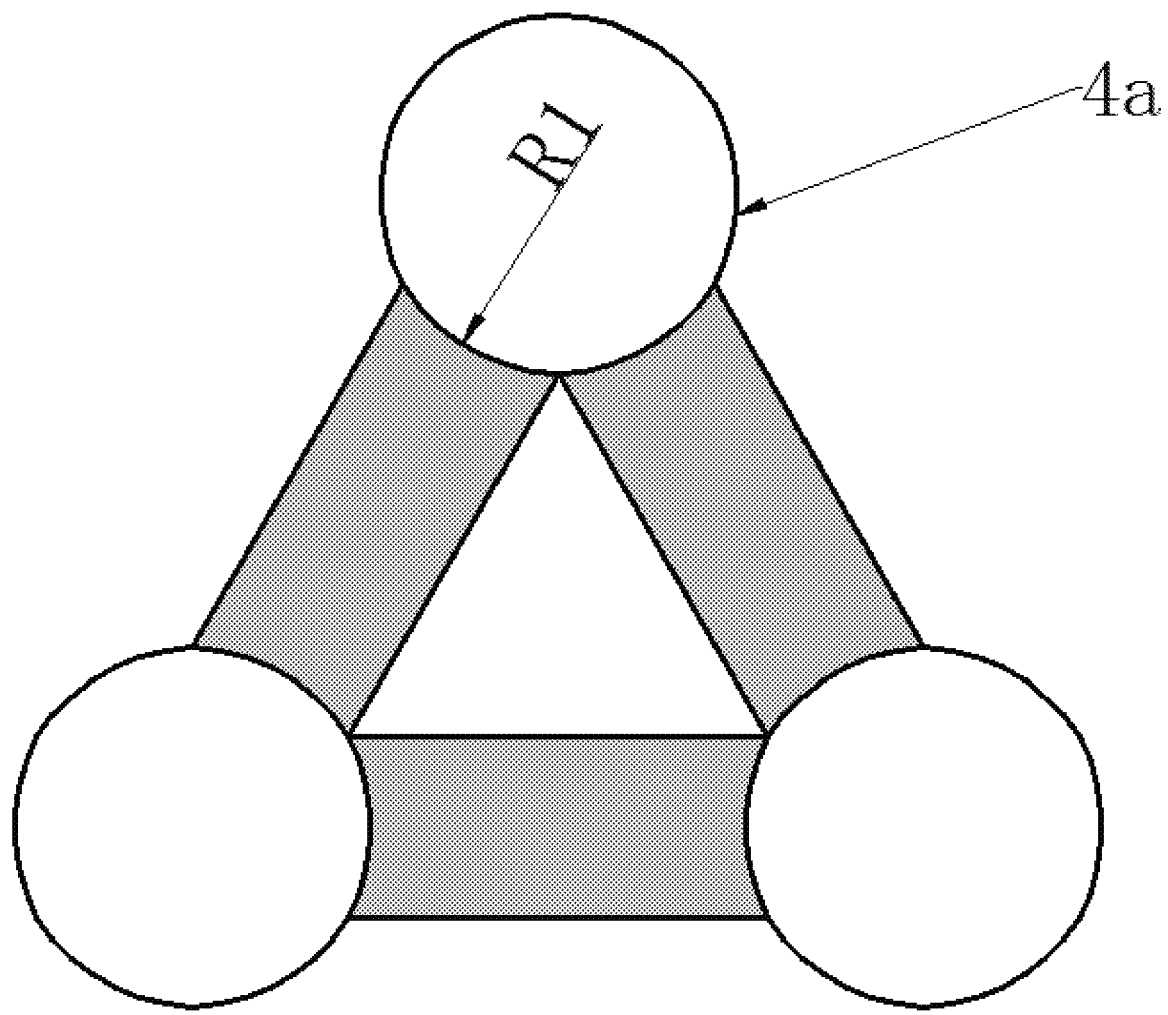
FIG. 3 is a schematic diagram of the unit cross-section that the hexagonal channel wall surface is replaced by curved wall surface of the present disclosure.
Figure 4:
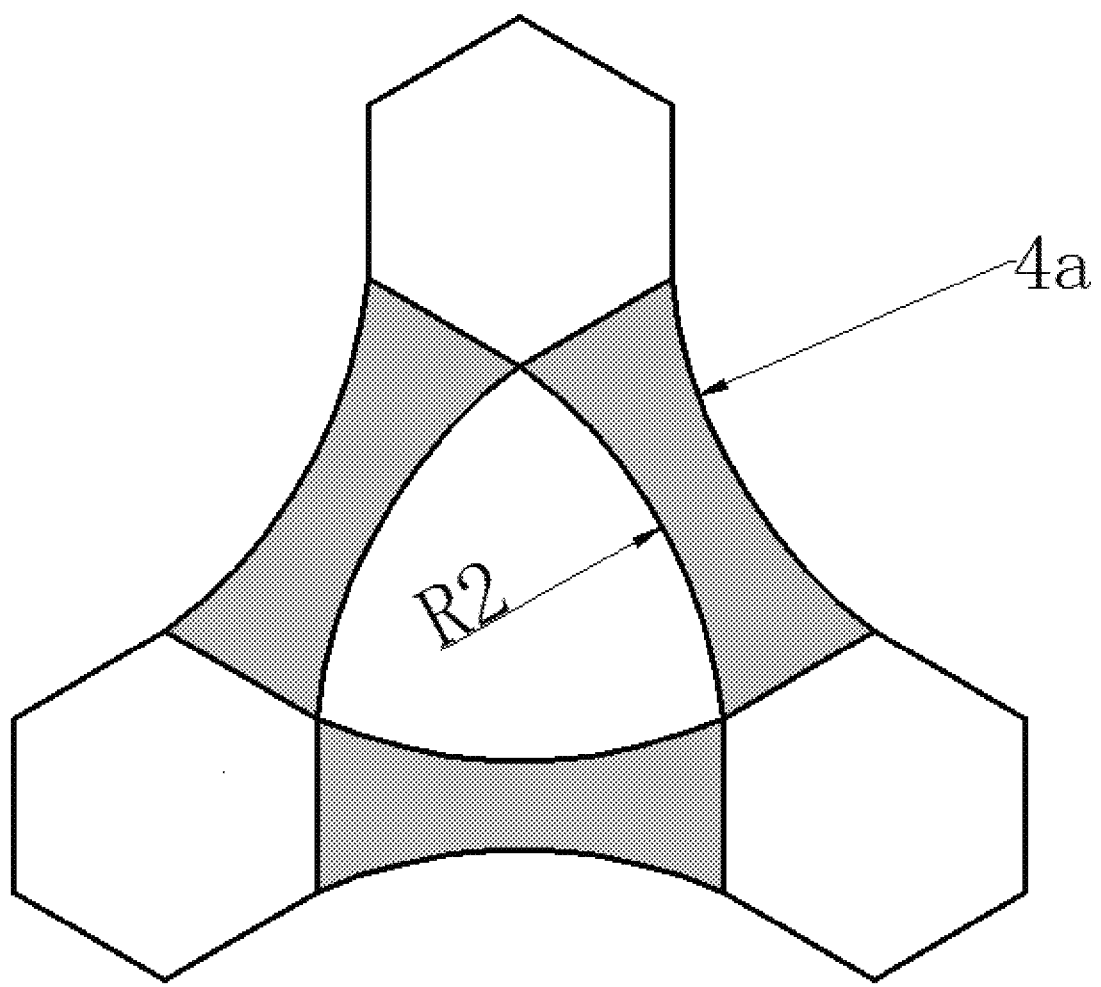
FIG. 4 is a schematic diagram of the unit cross section that the triangular channel wall surface is replaced by curved wall surface of the present disclosure.
Figure 5:
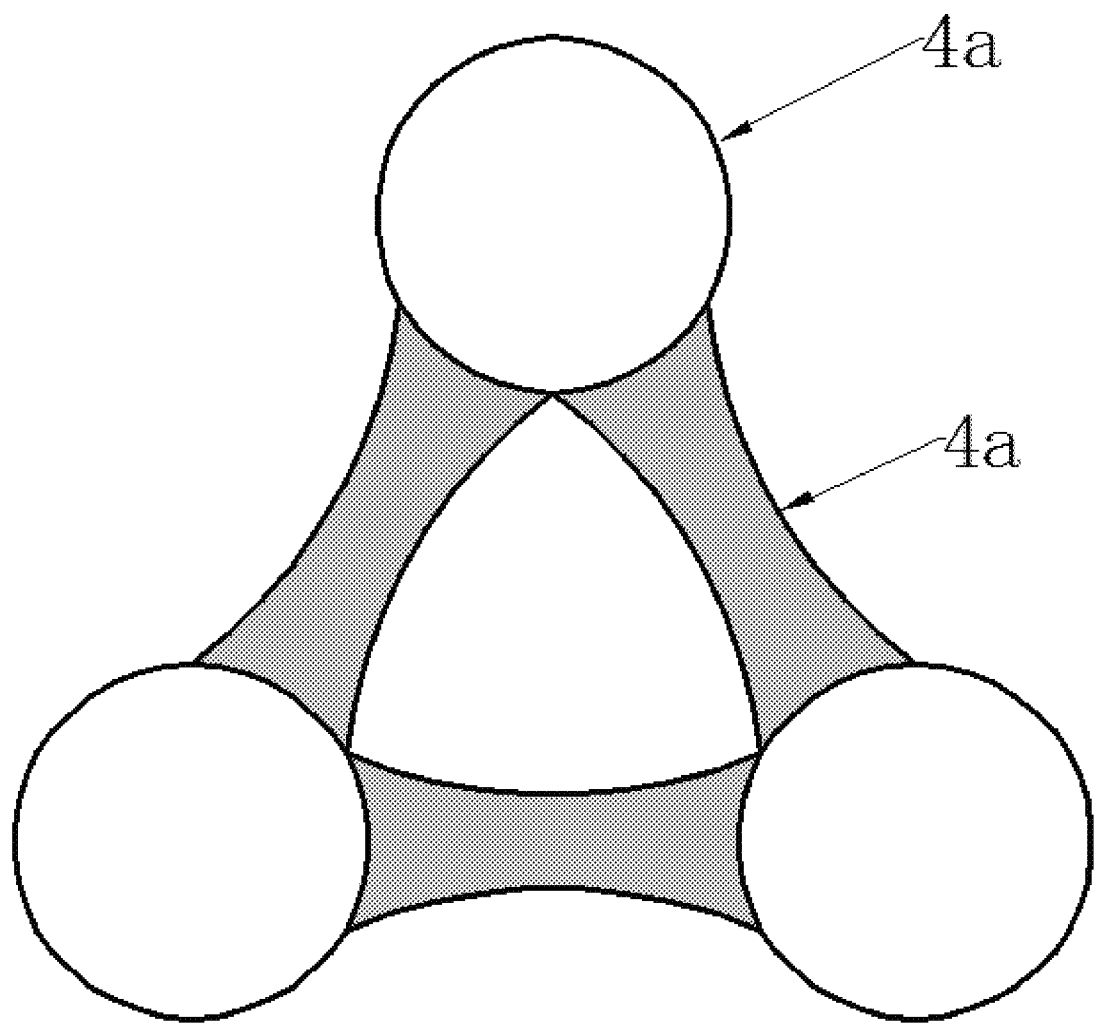
FIG. 5 is a schematic diagram of the unit cross section that the hexagonal channel surface and the triangular channel wall surface are replaced by curved wall surface of the present disclosure.

As shown in FIGS. 3 to 5, the hexagonal channel wall surface 4 and the triangular channel wall surface 5 are replaced by the curved channel wall surface 4a. The hexagonal channel wall surface 4 and the triangular channel wall surface 5 can be separately replaced or simultaneously replaced. The radii of R1 and R2 of the curved channel wall surface 4a can be adjusted.

Embodiment 2

Figure 6:
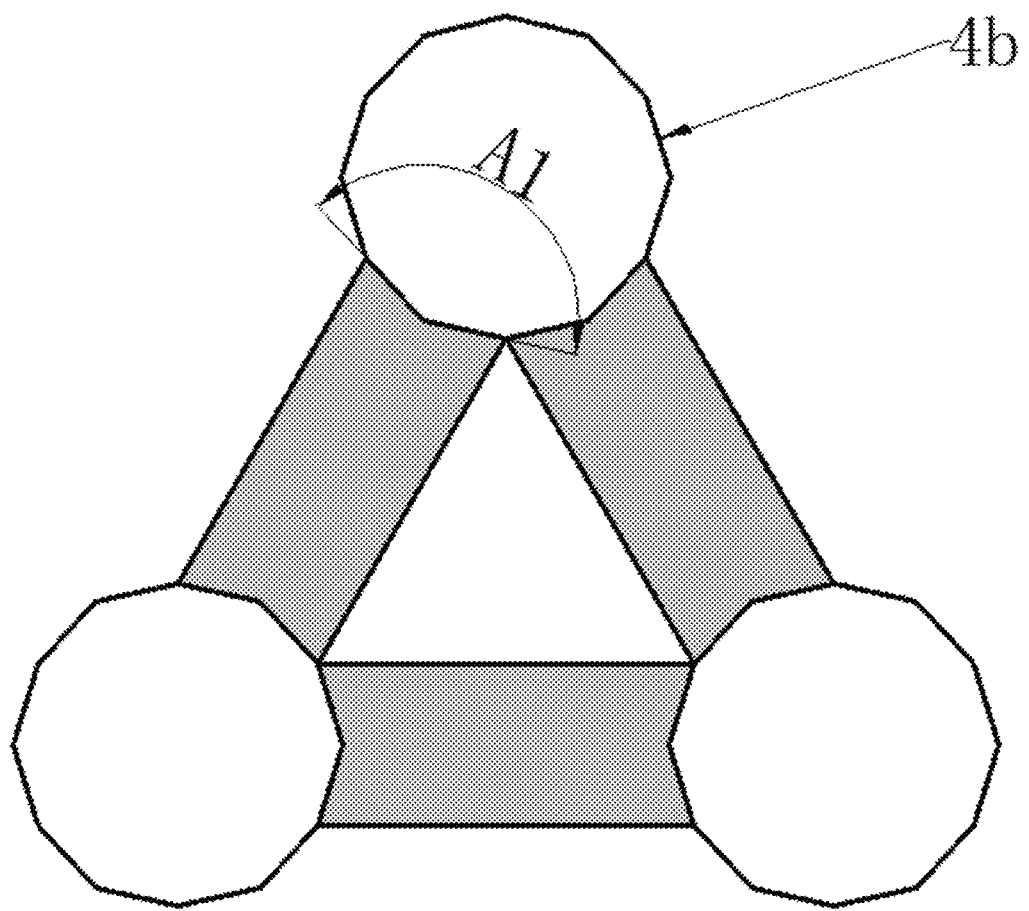
FIG. 6 is a schematic diagram of the unit cross section that the hexagonal channel wall surface is replaced by broken line wall surface of the present disclosure.
Figure 7:
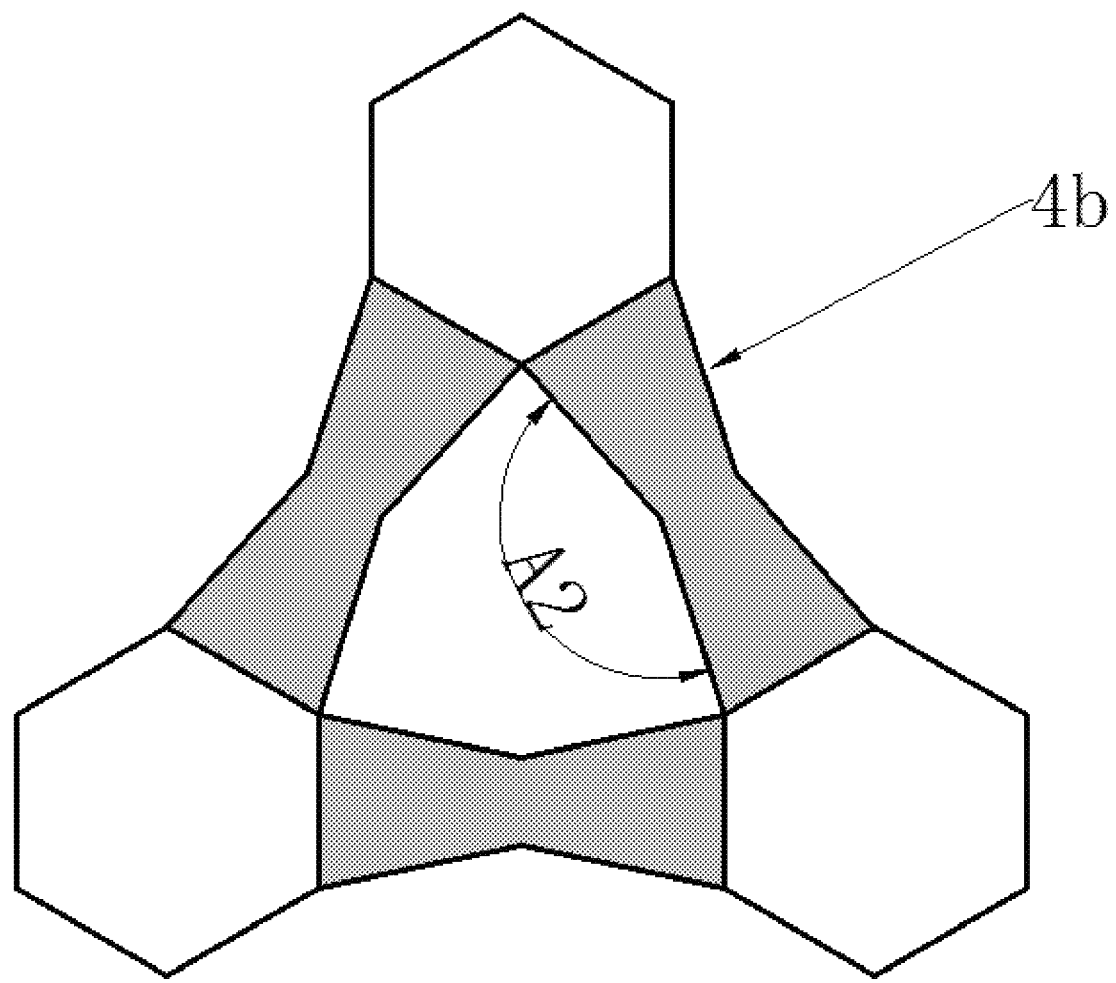
FIG. 7 is a schematic diagram of the unit cross section that the triangular channel wall surface is replaced by broken line wall surface of the present disclosure.
Figure 8:
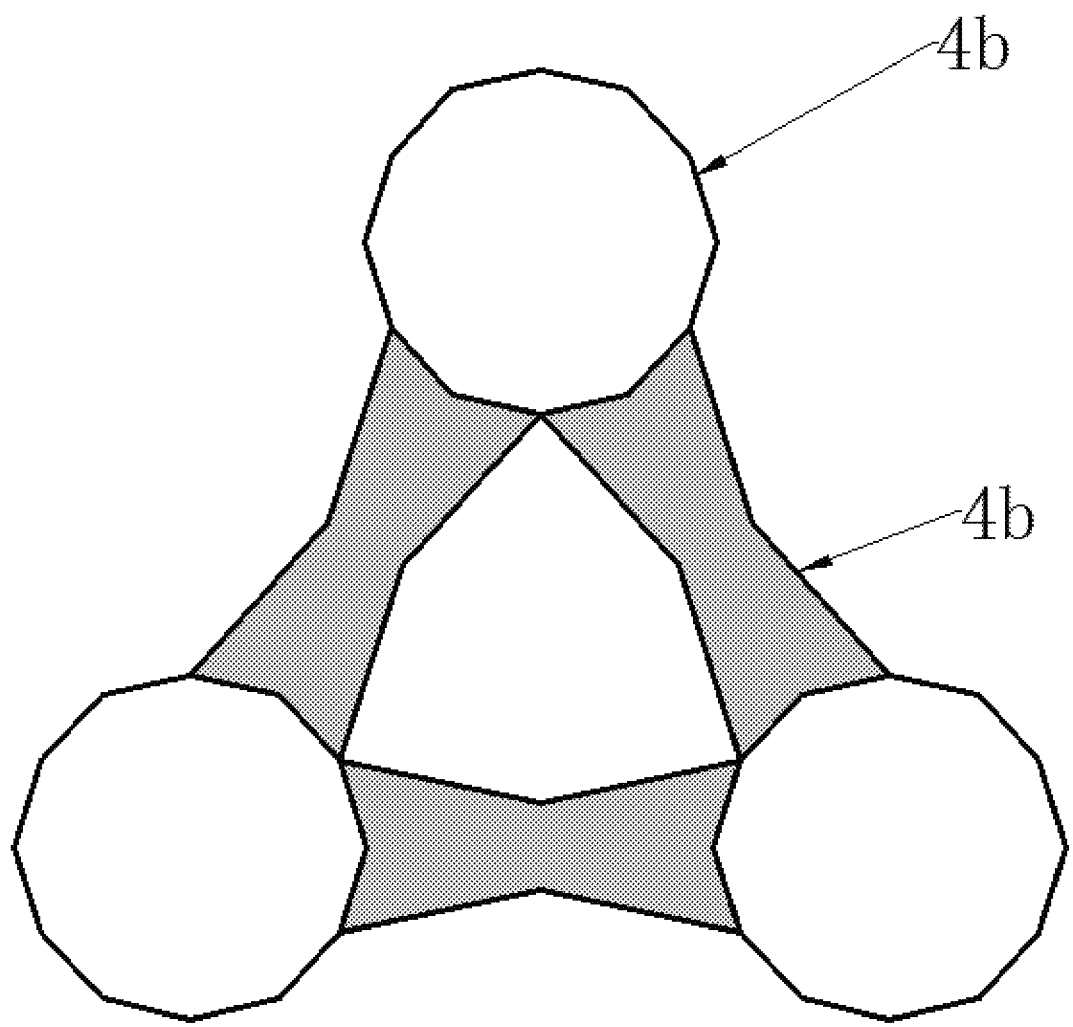
FIG. 8 is a schematic diagram of the unit cross section that the hexagonal channel surface and the triangular channel wall surface are replaced by broken line wall surface of the present disclosure.

As shown in FIGS. 6 to 8, the hexagonal channel wall surface 4 and the triangular channel wall surface 5 are replaced by the broken line channel wall surface 4b. The hexagonal channel wall surface 4 and the triangular channel wall surface 5 can be separately replaced or simultaneously replaced. The broken angles of A1 and A2 of the broken line wall surface 4b can be adjusted.

The sides of the hexagonal channel also can be replaced by outward convex broken lines, and the sides of the triangular channel can be replaced by outward convex curves. Or the sides of the hexagonal channel are replaced by outward convex curves, and the sides of the triangular channel are replaced by outward convex broken lines. The curved channel wall surface 4a and the broken line channel wall surface 4b adopted in the above embodiments can further expand the inlet channel volume, increase the filter body wall area, and effectively improve the performance of the asymmetric channel structure of the particulate trap.

Asymmetric channel structure can increase the filter body area and inlet channel volume, increasing the limiting carbon load by more than 30%. Therefore, using the filter body asymmetrical channel structure of the particulate trap can effectively control the pressure drop rise rate, extend the deashing mileage, reduce the regeneration frequency of the trap and decrease the cost of post-processing. Due to the superior performance, the filter body asymmetrical channel structure of particulate trap will have great application potential in the commercial application and popularization of particle post-processing technology.

Finally, it should be noted that the above embodiments are only used to illustrate the technical solutions of the present disclosure without limiting; although the present disclosure is described in detail with reference to some embodiments, the ordinary skilled in the art should understand that they may still make amendments to the technical solutions disclosed in the embodiments, or make equal replacements for some or all of their technical characteristics; these amendments or replacements do not remove the essence of the corresponding technical solutions from the scope of the technical solutions of the present disclosure.

The invention claimed is:

1. A particulate trap filter body, comprising a plurality of hexagonal channels, a plurality of square channels, and a plurality of triangular channels,
    wherein each hexagonal channel is composed of six filter walls, each square channel is composed of four filter walls, and each triangular channel is composed of three filter walls,
    wherein the plurality of hexagonal channels and the plurality of triangular channels are inlet channels opening at an inlet of the particulate trap filter body, and the plurality of square channels are outlet channels opening at an outlet of the particulate trap filter body,
    wherein each square channel has a first pair of opposite filter walls and a second pair of opposite filter walls, the first pair of opposite filter walls being shared with two of the plurality of hexagonal channels, and the second pair of opposite filter walls being shared with two of the plurality of triangular channels.

2. The particulate trap filter body according to claim 1, wherein the inlet channels are blocked at the outlet of the particulate trap filter body and the outlet channels are blocked at the inlet of the particulate trap filter body so that an exhaust gas flow entering the inlet channels, passing through a plurality of filter walls, and exiting through the outlet channels.

3. The particulate trap filter body according to claim 1, wherein a ratio of side length b of the triangular channel filter wall surface to side length a of the hexagonal channel filter wall surface is a preset value, and the ratio of b to a ranges from 0.5 to 5.

4. The particulate trap filter body according to claim 1, wherein each of the filter walls of each hexagonal channel are convex in shape or each of the filter walls of the triangular channel are convex in shape.

5. The particulate trap filter body according to claim 1, wherein each of the filter walls of each hexagonal channel is convex in shape and each of the filter walls of each triangular channel is convex in shape.

6. The particulate trap filter body according to claim 1, wherein each of the filter walls of each hexagonal channel has two sections at an angle to each other or each of the filter walls of each triangular channel has two sections at an angle to each other lines.

7. The particulate trap filter body according to claim 1, wherein each of the filter walls of each hexagonal channel has two sections at an angle to each other and each of the of the filter walls of each triangular channel has two sections at an angle to each other.

8. The particulate trap filter body according to claim 1, wherein each of the filter walls of each hexagonal channel has two sections at an angle to each other and each of the filter walls of the triangular channel are convex in shape.

9. The particulate trap filter body according to claim 1, wherein each of the filter walls of each hexagonal channel is convex in shape and each of the filter walls of each triangular channel has two sections at angle to each other.

* * * * *